(12) United States Patent
Choo

(10) Patent No.: US 6,981,140 B1
(45) Date of Patent: Dec. 27, 2005

(54) ROBUST ENCRYPTION AND DECRYPTION OF PACKETIZED DATA TRANSFERRED ACROSS COMMUNICATIONS NETWORKS

(75) Inventor: Tse Huong Choo, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 09/639,671

(22) Filed: Aug. 14, 2000

(30) Foreign Application Priority Data

Aug. 17, 1999 (GB) .................................. 9919444

(51) Int. Cl.[7] ............................................ G06F 17/00
(52) U.S. Cl. ...................... 713/164; 713/193; 713/166
(58) Field of Search ................................. 713/164, 167, 713/151–154, 166, 193

(56) References Cited

U.S. PATENT DOCUMENTS 6,363,477 B1 * 3/2002 Fletcher et al. ............. 713/151
6,385,727 B1 * 5/2002 Cassagnol et al. .......... 713/193

FOREIGN PATENT DOCUMENTS

| GB | 2 317 792 | 4/1998 |
| WO | 95/18496 | 7/1995 |
| WO | 98/27685 | 6/1998 |

OTHER PUBLICATIONS

Implications of Executing Compression and Encryption Applications on General Purpose Processors Byeong Kil Lee; John, L.K.; Computers, IEEE Transactions on vol. 54, Issue 7, Jul. 2005 Page(s):917-922.*
Improving memory encryption performance in secure processors Jun Yang; Lan Gao; Youtao Zhang; Computers, IEEE Transactions on vol. 54, Issue 5, May 2005 Page(s): 630-640.*
A system level implementation of Rijndael on a memory-slot based FPGA card Tong, D.K.Y.; Pui Sze Lo; Kin Hong Lee; Leong, P.H.W.; Field-Programmable Technology, 2002. (FPT). Proceedings. 2002 IEEE International Conference on Dec. 16-18, 2002 Page(s);102-109.*

* cited by examiner

Primary Examiner—David Jung

(57) ABSTRACT

A method for improving fault tolerance and data throughput rates in the transfer of data between computing entities across a virtual private network comprises the steps of: logically dividing a memory means associated with a first said communicating entity into a plurality of areas; receiving encrypted data from said second communicating entity; storing said encrypted data in the first memory area associated with said first communicating entity; writing said encrypted data stored in said first memory area into a second memory area associated with said first communicating entity; decrypting said encrypted data stored in said second memory area; and writing said decrypted data from said second memory area to said first memory area.

27 Claims, 13 Drawing Sheets

ROBUST ENCRYPTION AND DECRYPTION OF PACKETIZED DATA TRANSFERRED ACROSS COMMUNICATIONS NETWORKS

FIELD OF THE INVENTION

The present invention relates to a method of processing encrypted data packets transmitted between communicating entities across a communications network.

BACKGROUND TO THE INVENTION

It is known to transfer digital data between communicating entities such as digital computers and the like across computer networks such as wide area networks (WAN), local area networks (LAN) and the internet. This digital data may represent digitized audio or video signals, or increasingly, sensitive financial information such as credit card details, banking information and the like.

Referring to FIG. 1 herein, there is illustrated schematically two such computing entities 100 and 101 configurable to exchange data across a communications network 102.

With the development of technologies such as the world wide web (WWW) there has been a rapid increase in the use of networks of computing entities to exchange sensitive information carried as data across the networks. As the amount of sensitive data being transferred across networks has increased there has been increasing pressure to develop and improve the security of transferred data. It is known to improve the security of data transfer between digital computers by encrypting the data using one or a plurality of standard encryption algorithms and transmitting the encrypted data across a network where it may be decrypted and subsequently processed only by those recipients for whom the encrypted data is intended.

Referring to FIG. 2 herein, there is illustrated schematically a conventional system for encrypting user data and transferring the encrypted data across a network for subsequent decryption. A first digital computer 200 is represented schematically to include the following sub-components:

- A kernel/operating system (OS) 201 which occupies a logical location or plurality of logical locations within an electronic memory of the first digital computer 200;
- A plurality of user applications 202–204 which are stored within a second memory area which is logically distinct from the memory locations storing the operating system, the second memory area also known herein as "user memory"; and
- A network interface card 205 which is configurable to convert digital data into a form suitable for physical transmission across a network 250.

The kernel/operating system comprises a network protocol stack. The network protocol stack may be considered as a series of functional layers within the operating system which are configured to convert data received from, for example, processes operating in user memory, and to convert this data into a form suitable for passing to a network interface card for subsequent transmission to a remote computer. As described herein, a protocol is a pre-determined set of procedures used for exchanging information between computing entities for example such as digital computers 200 and 210 in FIG. 2. A protocol may be the subject of an international standard or a de facto standard. Data which is to be transferred across the network 250 from first computer 200 to a second computer 210 is passed down the protocol stack. For example, the data may pass through a known transmission control protocol (TCP) or user datagram protocol (UDP) layer 206 down through an internet protocol layer (IP) 207, and ultimately via a physical layer to the network interface card 205.

A conventional network protocol stack may include the following layers:
- TCP/UDP
- Internet protocol (IP) layer
- Physical layer.

The requirement to develop secure means of transmitting information between computing entities has previously been addressed by the insertion of an extra functional encryption layer within the network protocol stack. As illustrated in FIG. 2 herein, an additional encryption layer 208 encrypts data to be sent from a computer or decrypts encrypted data sent from a remote device. This encryption layer 208 is known conventionally as an Internet Protocol Security (IPSec) layer. In order to provide secure transmission of data between entities across a network each internet protocol security layer must have access to at least one data base of private key information. Networks between computing entities which are secured by the transmission of encrypted data are known in the prior art as virtual private networks (VPN). Conventional virtual private networks incorporating an internet protocol security layer and an associated private key data base into the network protocol stack as illustrated in FIG. 2 herein are also known as "bump in the stack" (BITS) systems. The internet protocol security layer 208 accesses a first data base of private key information 209 to encrypt or decrypt data. The private key database 209 contains a same private key data as second private key data base 219 which is associated with a remote second computer 210 which is itself configured to exchange encrypted data with first computer 200 and has a corresponding protocol stack to the protocol stack of the first computer 200. The second computer comprises a kernel/operating system 211, a plurality of applications 212, 213 and a network interface card 215 and has an internet protocol security layer 218. Typically, encryption and decryption of user data may be carried out using a standard cipher such as the prior art Data Encryption Standard (DES).

Referring to FIG. 3 herein there is illustrated schematically a conventional unencrypted data packet 300 with an IP header 301 as transmitted across a conventional network. An unencrypted data packet is also known herein as a "clear" data packet. There is also illustrated schematically an encrypted data packet 302 having both an IP header 303 and an internet protocol security header 304. Data encryption is carried out by internet protocol security layer 208 which also appends the internet protocol security header data 304 to the encrypted data 305.

Referring to FIG. 4 herein, there is illustrated schematically a conventional encryption system incorporating an internet protocol security layer 400 and associated keying data stored in a key database 401. Inserted into a network protocol stack resident within a kernel/operating system, is an Internet Key Exchange protocol 402 which is designed for negotiating the exchange of keying material, such as contained within key data base 401, between computer entities which wish to exchange data encrypted using the internet protocol security stack 400. In a conventional virtual private network the internet key exchange protocol resides within a region of user memory, outside of the kernel/operating system.

However, there are significant problems introduced in the prior art when the internet protocol security stack is located within the kernel/operating system. Locating the internet protocol security stack within the network protocol stack necessitates that, in a conventional operating system, the internet protocol security stack must operate in supervisory mode. In the event of a fault occurring during an encryption or decryption operation then the entire operating system may be affected. Malfunctioning of the internet protocol security stack may arise from the internet protocol security stack receiving incorrectly formatted data packets for example as a result of a deliberate attack by an individual wishing to cause damage to the system. The consequences of receiving an incorrectly formatted data packet are that it may result in a buffer memory overflow or in the overwriting of memory locations reserved for the operating system. This can result in causing the kernel/operating system to crash which consequently causes remaining systems, which depend upon the kernel/operating system, to crash.

Additionally, conventional operating systems are single threaded and non-reentrant and hence are not designed to run on multiple processors. The encryption or decryption of a plurality of data packets can occupy a substantial fraction of total processor resources available to an operating system with the result of a reduction in the fraction of processing resources available to user processes, which thereby affects overall system performance.

It is important to develop more fault tolerant encryption and decryption of user data for transfer across virtual private networks in order to improve the resistance to malicious attack and operating efficiency of networked computers.

SUMMARY OF THE INVENTION

Specific embodiments and methods according to the present invention aim to improve the tolerance to faults in computer systems configurable to exchange encrypted digital data across virtual private networks by isolating error prone encryption/decryption means from a computer operating system and thereby improve the reliability and security of computer systems.

According to a first aspect of the present invention there is provided a method of processing encryption data in a computing entity said method comprising the steps of:
 assigning a memory means of said computing entity into a plurality of memory areas;
 receiving encrypted data;
 storing said encrypted data in a first said memory area of said computing entity, said first memory area assigned for use by a kernel of an operating system of said computing entity;
 writing said encrypted data stored in said first memory area into a second memory area associated with said computing entity;
 decrypting said encrypted data stored in said second memory area; and
 writing said decrypted data from said second memory area to said first memory area.

Preferably said first memory area is logically distinct from said second memory area.

Preferably said first memory area is configured to contain code of an operating system program for controlling said computing entity.

Preferably said second memory area is partitioned from said first memory area such that said second memory area is not used for operation of said operating system.

According to a second aspect of the present invention there is provided a method of processing encryption data in a computing entity said method comprising steps of:
 assigning a memory means associated of said computing entity into a plurality of memory areas;
 storing decrypted data in a first said memory area of said plurality of memory areas, said first memory area being assigned for use by a kernel code of an operating system of said first computing entity (820);
 writing said stored data into a second memory area of said plurality of memory areas associated with said first communicating entity;
 encrypting said data stored in said second memory area; and
 writing said encrypted data from said second memory area to said first memory area.

Preferably said first memory area is logically distinct from said second memory area.

Preferably said first memory area is configured to contain code of an operating system program for controlling said computing entity.

Preferably said second memory area is partitioned off from said first memory area such that said second memory area is not used for operation of said operating system.

Suitably said redirection means is configured to receive decrypted data from said second memory area.

According to a third aspect of the present invention there is provided a method of processing encrypted data in a computing entity, said computing entity comprising;
 a processor; and
 a memory means,
 wherein said memory means is divided into first and second memory areas, wherein said first memory area contains code of an operating system of said computer entity, said method comprising the steps of:
 receiving an encrypted data packet;
 processing said data packet according to at least one packetization protocol of said operating system in said first memory area;
 outputting said data packet to said second memory area;
 processing said data packet according to a decryption algorithm in said second memory area; and
 returning said processed data packet to said operating system in said first memory area.

According to a fourth aspect of the present invention there is provided a digital computer configurable for transmitting digital data across a communications network, said digital computer comprising;
 at least one processor unit;
 a memory means, wherein said memory means is logically sub divided into at least a first memory area and a second memory area;
 a redirection means for writing data from said first memory area to said second memory area and from said second memory area to said first memory area; and
 encryption means logically located within said second memory area, said encryption means configurable for encrypting said data.

According to a fifth aspect of the present invention there is provided a digital computer configurable for receiving digital data transmitted across a communications network, said digital computer comprising:
 at least one processor unit;
 a memory means, wherein said memory means is assigned into at least a first memory area and a second memory area;
 a redirection means for writing data from said first memory area to said second memory area and from said second memory area to said first memory area; and
 decryption means logically located within said second memory area for decrypting data stored in said second memory area, said decryption means being configurable for decrypting said data.

Preferably said digital computer further comprises a means for providing an interface between said first memory means and said communications network.

Preferably said redirection means comprises;
a redirection layer; and
a port for interfacing said redirection layer and said encryption means.

Preferably said encryption means logically located within said second memory area comprises:
an internet protocol security stack; and
a database configurable to contain key data for encrypting said data.

Preferably, said encryption means logically located within said second memory area comprises:
a plurality of internet protocol security stacks; and
a plurality of data bases configurable to contain key data for encrypting said data, wherein each data base of said plurality of databases contains a same key data.

Said plurality of internet protocol security stacks may be generated using a plurality of computing languages.

According to a sixth aspect of the present invention there is provided a computing entity comprising:
a data processing means;
a memory means;
an operating system having a set of kernel code, containing a communications protocol stack code;
a plurality of encryption and decryption means;
a first area of said memory means being assigned to said operating system code;
a second area of said memory means being assigned to said plurality of encryption and decryption means, said second memory area being sub-assigned into a plurality of compartmented memory areas within said second memory area, wherein individual ones of said encryption and decryption means are resident in corresponding respective ones of said plurality of compartmented memory areas.

Preferably said computing entity further comprises a director means resident in said first memory area, said director means arranged to input data from and output data to said communications protocol stack.

Suitably the director means sends a plurality of data streams to said plurality of compartmented memory areas and receives a plurality of data streams from said plurality of compartmented memory areas.

Said director means may operate to send a corresponding respective data stream to each of said plurality of compartmented memory areas, and receive said corresponding respective data stream from said corresponding compartmented memory areas.

The computing entity may further comprise a plurality of ports resident in said first memory area, there being at least one said port per said compartmented memory area, said port positioned between a said corresponding respective compartmented memory area, and a director means for directing data streams to and from said plurality of compartmented memory areas, said director means being resident in said first memory area.

The computing entity may comprise a plurality of data processors, said plurality of data processors providing processing capability for carrying out data processing operations within said plurality of compartmented memory areas.

According to a seventh aspect of the present invention there is provided a method of encryption processing a plurality of packet data streams between first and second layers of a communications protocol stack, said method comprising the steps of:
receiving a first said data packet stream from a first layer of said protocol stack in a first memory area;
sending said data packet stream to a first compartmented memory area;
running an encryption process on said first data packet stream in said first compartmented memory area for encryption or decryption of said data packet stream;
returning said processed data packet stream from said first compartmented memory area to a second layer of said communications protocol stack layer in said first memory area;
receiving a second packet data stream from a said first or second layer of said communications protocol stack in said first memory area;
sending said second data packet stream to a second compartmented memory area;
encryption processing said second data packet stream in said second compartmented memory area for encryption or decryption of said data packet stream; and
returning said processed second packet data stream to the other one of said first or second layers of said communications protocol stack in said first memory area,
wherein said first compartmented memory area is assigned to said first process, said second compartmented memory area is assigned to said second process, and said first memory area is assigned to an operating system of said computing entity.

The method may include the step of running a plurality of processes in a said compartmented memory area, for processing a said packet data stream.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific implementation and methods according to the present invention as described herein are aimed at computing entities configured to exchange encrypted data across digital communications networks, including but not limited to local area networks, wide area networks, the internet and telecommunications networks.

Figure 1:
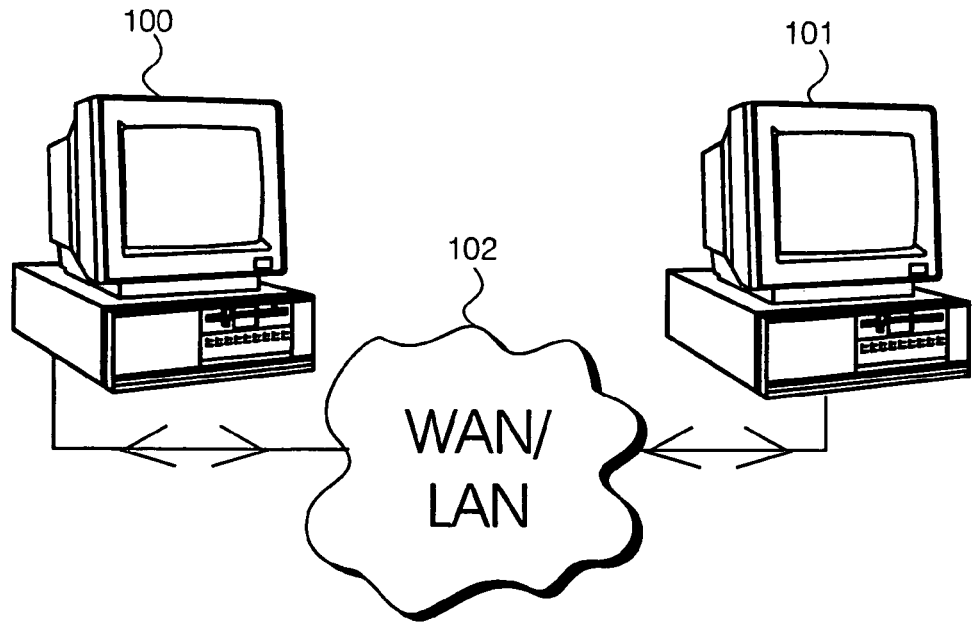
FIG. 1 illustrates schematically a plurality of computing entities exchanging data across a communications network, as is known in the prior art.
Figure 3:
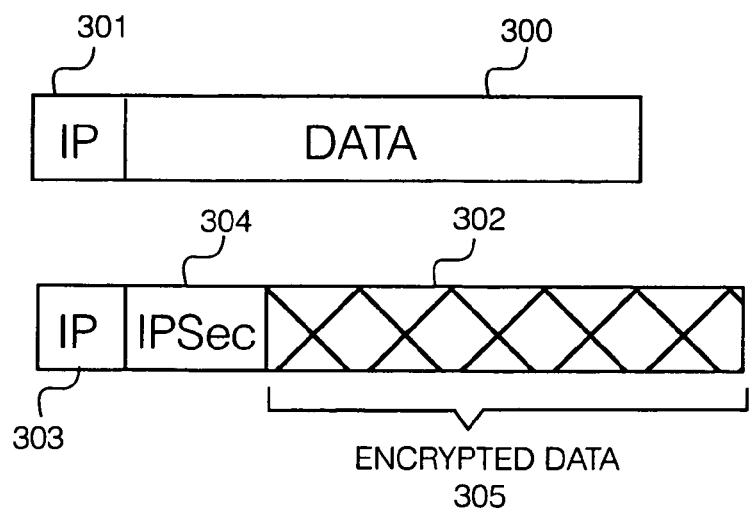
FIG. 3 illustrates schematically a prior art internet protocol (IP) unencrypted data packet, and a prior art encrypted internet protocol data packet.
Figure 2:
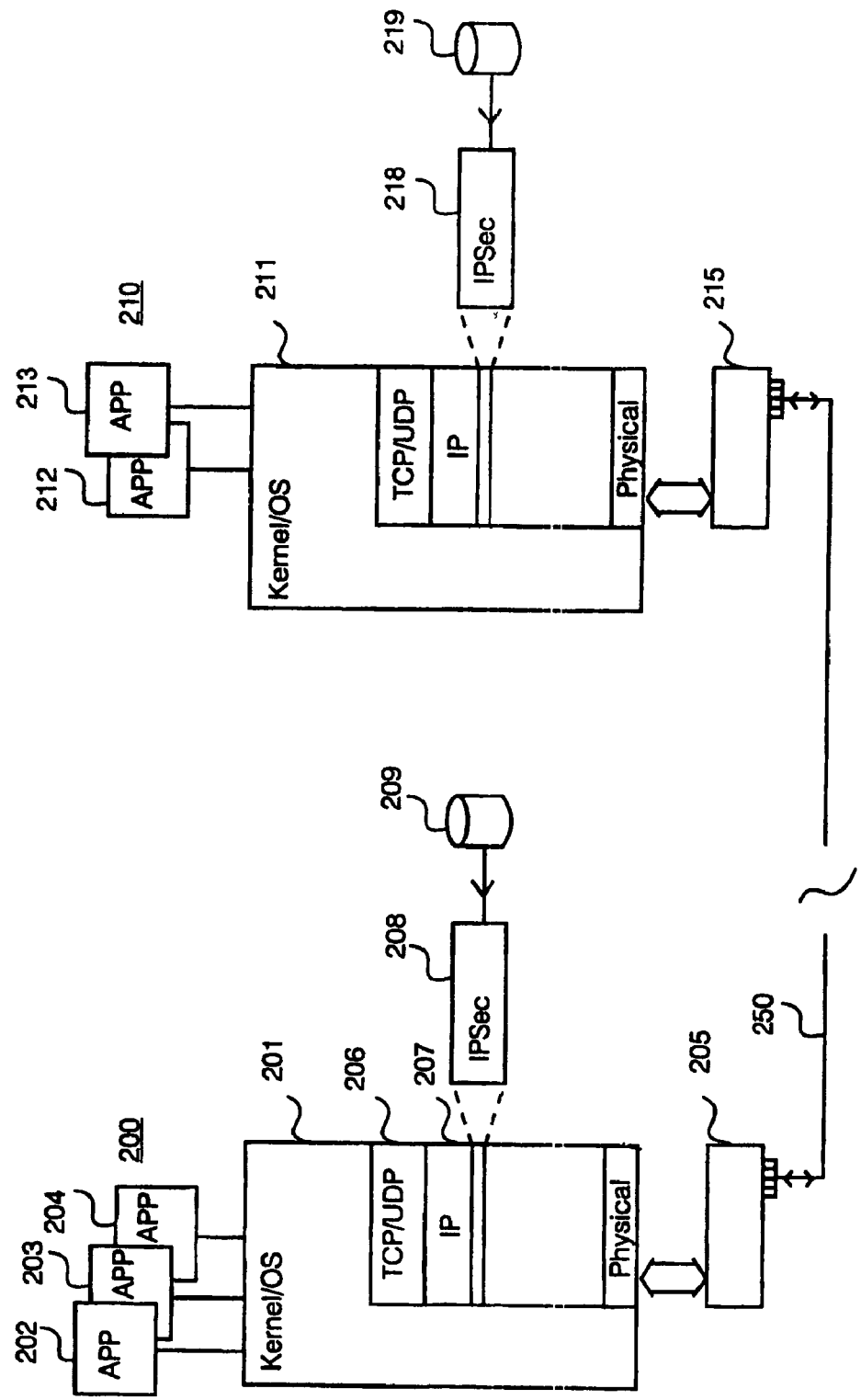
FIG. 2 illustrates schematically protocol stacks for first and second computing entities exchanging encrypted data over a communications network, as is known in the prior art.
Figure 4:
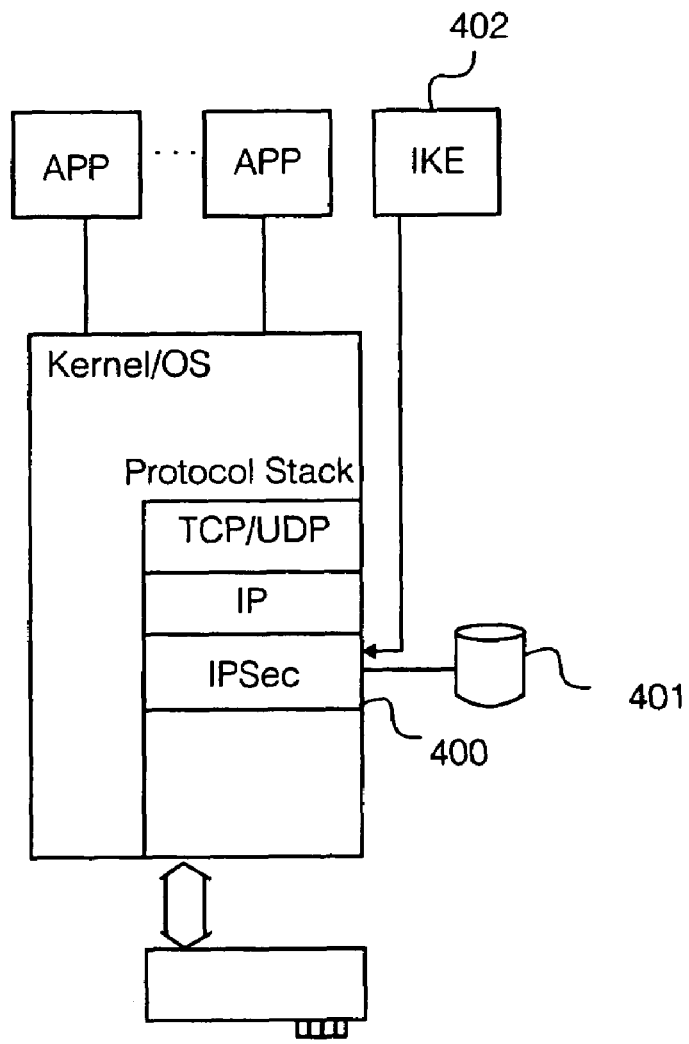
FIG. 4 illustrates schematically elements of a computing entity incorporating a prior art encryption system having an internet protocol security layer and a key exchange protocol for negotiating an exchange of key data.
Figure 5:
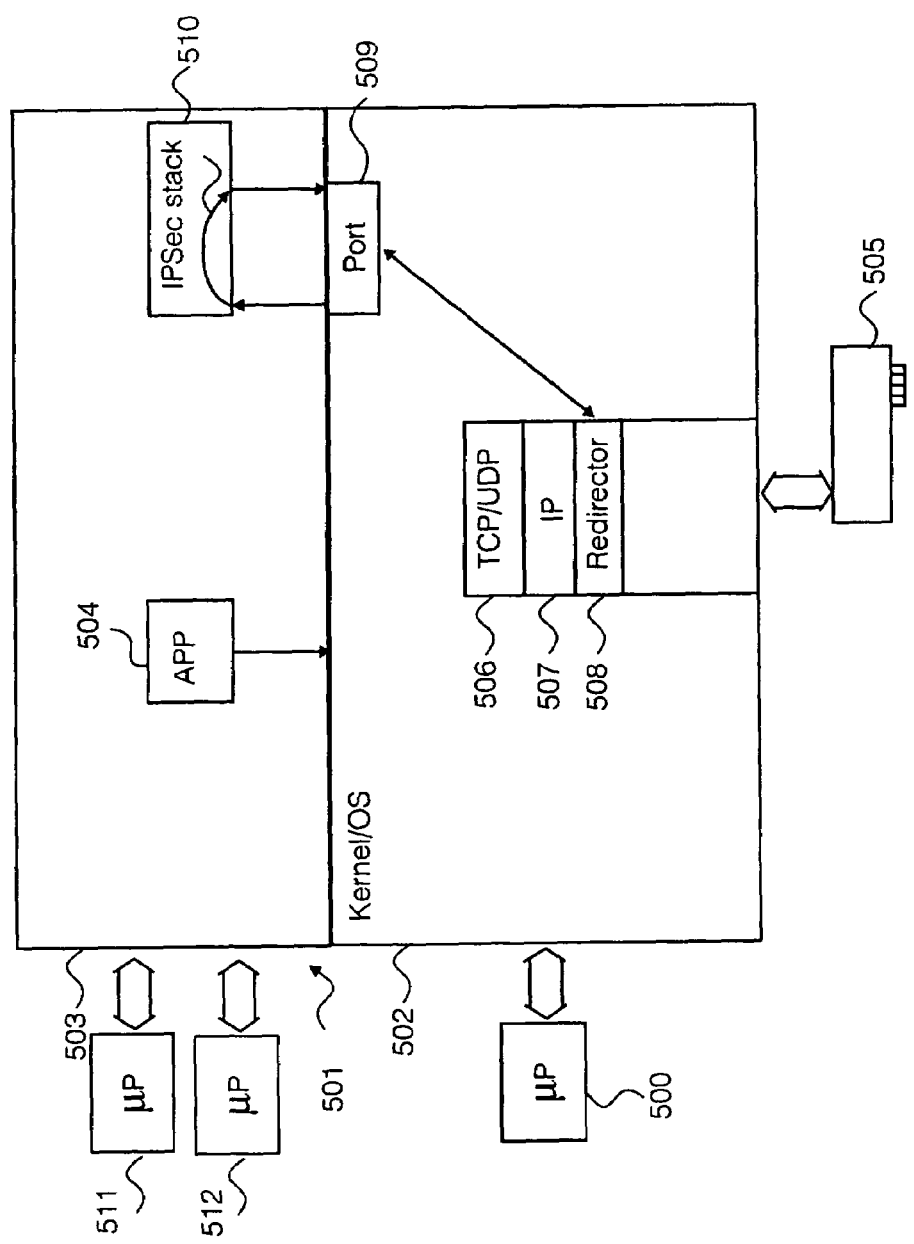
FIG. 5 illustrates schematically a fault tolerant encryption/decryption system for use in transmitting encrypted data between a plurality of computing entities across a network according to a first specific implementation of the present invention.

Referring to FIG. 5 herein, there is illustrated schematically a method and apparatus according to a best mode implementation of the present invention for robust encryption and decryption of data, for transmission over a communications network. The best mode implementation is described in relation to a virtual private network, however the invention is not limited to a virtual private network, but is limited only by the scope of the claims herein. Encryption comprises a process or plurality of processes applied to a message or data whereby the message or data are rendered unintelligible except by those authorized to receive it. Decryption is a complementary process to encryption whereby an encrypted message or data are processed to reveal the original, unencrypted information. A computing entity comprises a processor 500, an area of memory 501 divided into a first memory area 502 reserved for operation of an operating system, and a second memory area 503 in which one or a plurality of application programs 504 may operate, under control of the operating system code; and a communications means such as a network interface card 505 for communicating with other computer entities. The operating system comprises a set of code referred to as a 'kernel' which performs the basic functions of input and output functions including communications, as well as memory management functions. In addition to the kernel code, the operating system comprises a non-kernel code for performing other functions of the operating system, for example functions for viewing directories or copying files. The operating system code comprises code for operating network protocols, according to a protocol stack including protocols for the transmission control protocol/internet protocol (TCP/IP) 506, a user datagram protocol/internet protocol (UDP/IP stack) 507. When data is sent or received through network interface card 505, the data passes up or down the protocol stack comprising the protocol layers 506, 507 to be converted and deconverted between a data form suitable for use by the computing entity, and a data format suitable for use for transmission over a communications network accessible via the network interface card 505.

In prior art systems, the operating system is partially protected from failure of applications running in user memory. Should an application fail, for any reason, then whilst the application itself may terminate abruptly it is unlikely to have any serious consequences for the operation of the operating system. As described herein before, a prior art solution to the problem of providing a software based virtual private network is to insert an internet protocol security layer within the network protocol stack located within the operating system. If, due to receiving incorrectly formatted data, the internet protocol security stack crashes because the stack is in a kernel of the operating system, then this could crash the entire operating system. In addition to faults occurring in the internet protocol security stack due to receipt of malformed data packets it is likely that there will be programming errors within any particular implementation of the internet protocol security protocol.

According to a preferred embodiment of the present invention, data encryption is effected by employing a standard known encryption protocol—the internet protocol security protocol, but with the code of the internet protocol security protocol residing and running in an area of memory which is logically distinct from that used by the kernel of the operating system of the computing entity.

According to the best mode described herein, in order to isolate the kernel/operating system from faults arising from the operation of the internet protocol security stack during encryption or decryption of user data an internet protocol security stack is located within the second area of memory 503 which is logically distinct from the first memory area 502 containing the kernel/operating system. The second memory area 503 comprises a plurality of locations within a total memory means of the computer which are allocated for storing user applications programs. The second memory area 503 is known herein as "user memory". The user memory area distinct from that containing the kernel code may be accessed by remaining parts of the operating system for running applications, but the code comprising the kernel in particular is not resident in the user memory area.

Referring again to FIG. 5 herein first region 502 of computer memory 501 is configured to contain encoded instructions comprising the operating system. Contained within the operating system are the set of protocols configured to process data for transmission across a network. The set of protocols comprises a network protocol stack such as the Transmission Control Protocol/Internet Protocol (TCP/IP) or User Datagram Protocol/Internet Protocol (UDP/IP) stacks. According to a specific implementation of the present invention, the network protocol stack includes the following sub layers:

TCP/UDP (506);
Internet Protocol (IP)(507);
A redirector layer (508).

Redirector layer 508 is an intermediary layer in the protocol stack configured to receive data packets travelling up the stack from a lower layer or down the stack from a higher layer. The redirector layer 508 determines whether or not a received data packet requires encryption or decryption and if so passes the data packet to a port 509. Preferably, port 509 is implemented in software and is configured to exchange data with an internet protocol security stack 510 residing in the region of user memory (503) which is also known herein as user space. The software port 509 is preferably a known STREAMS-based driver. Port 509 is configured to be an interface between the network protocol stack within the kernel and the internet protocol security stack 510 running as a process within user memory area 503. The STREAMS standard provides a framework for implementing input/output functions in a modular fashion. This provides an alternative to a traditional UNIX character input/output (I/O). Use of the STREAMS framework is described in "STREAMSUX for the HP9000 Reference manual", Hewlett Packard Co. (1995).

By separating the internet protocol security stack to run in the second memory area, apart from the first memory area used for running the kernel/operating system, additional processing power may be brought to bear on the data processing carried out by the internet protocol security stack 510, as shown schematically in FIG. 5 by the presence of a plurality of additional micro processors 511, 512.

Data to be either encrypted or decrypted by the internet protocol security stack 510 is first transferred from the redirector layer 508 to the internet protocol security stack 510 in the second memory area, via software port 509. The data to be encrypted or decrypted are processed for encryption or decryption within internet protocol security stack 510. The encrypted or decrypted data are passed back to software port 509 and then back to redirector layer 508.

Encryption and the complementary decryption of data to be transferred across a virtual private network, according to the best mode presented herein, may be effected using a standard encryption cipher such as the known data encryption standard (DES). The data encryption standard is a block cipher configured to encrypt user data in 64-bit blocks. A 64-bit block of unencrypted data is processed into a 64-bit block of encrypted data. Additionally, DES is a symmetric algorithm requiring a same "key" to both encrypt and decrypt user data. Hence, a same key must be stored securely at both computing entities which are to exchange encrypted data across a virtual private network. The key used for encrypting and decrypting user data with the DES cipher is typically 8 characters long. A number of private keys stored in a key database associated with the internet protocol security stack 510 may lie in a range one to several thousand, the number of private keys stored being related to a number of connections required to be made between a first computing entity and a plurality of remote computing entities. By way of example, a digital computer configured as a server may typically require twice as many private keys associated with a single internet protocol security stack as the number of connections to client machines.

In an alternative embodiment of the present invention, user data to be transmitted across a virtual private network may be encrypted and decrypted using a known cipher such as Triple-DES. This cipher provides enhanced resistance to cryptanalysis at the cost of requiring a private key, typically 24 characters in length. However, it will be understood by those skilled in the art that the scope of the present invention is as defined within the claims herein and not limited by the precise details of the encryption and decryption algorithms used.

The encrypted or decrypted user data is passed to software port 509 and back to the redirector layer 508. If the user data processed by the internet protocol security stack 510 has been encrypted for transmission over a network to a remote computing entity then the encrypted data is passed from redirector layer 508 to network interface card 505 and is subsequently transmitted over the virtual private network. Encrypted data which has been received by network interface card 505 from a remote digital computer or other computing entity and which has been subsequently decrypted by internet protocol security stack 510 is passed up the network protocol stack by redirector layer 508 and is subsequently routed to an application 504 which is located within user memory. The redirection of data between the operating system/kernel and user memory, encryption and decryption of data are effected by the microprocessor 500 operating according to a set of instructions stored within the operating system/kernel and user memory 503.

Whilst the methods disclosed herein may be applied to a variety of operating systems such as Windows NT4.0 it is preferable that such methods as described herein are implemented in a system using an operating system such as HP-UX10.24.

Figure 6:
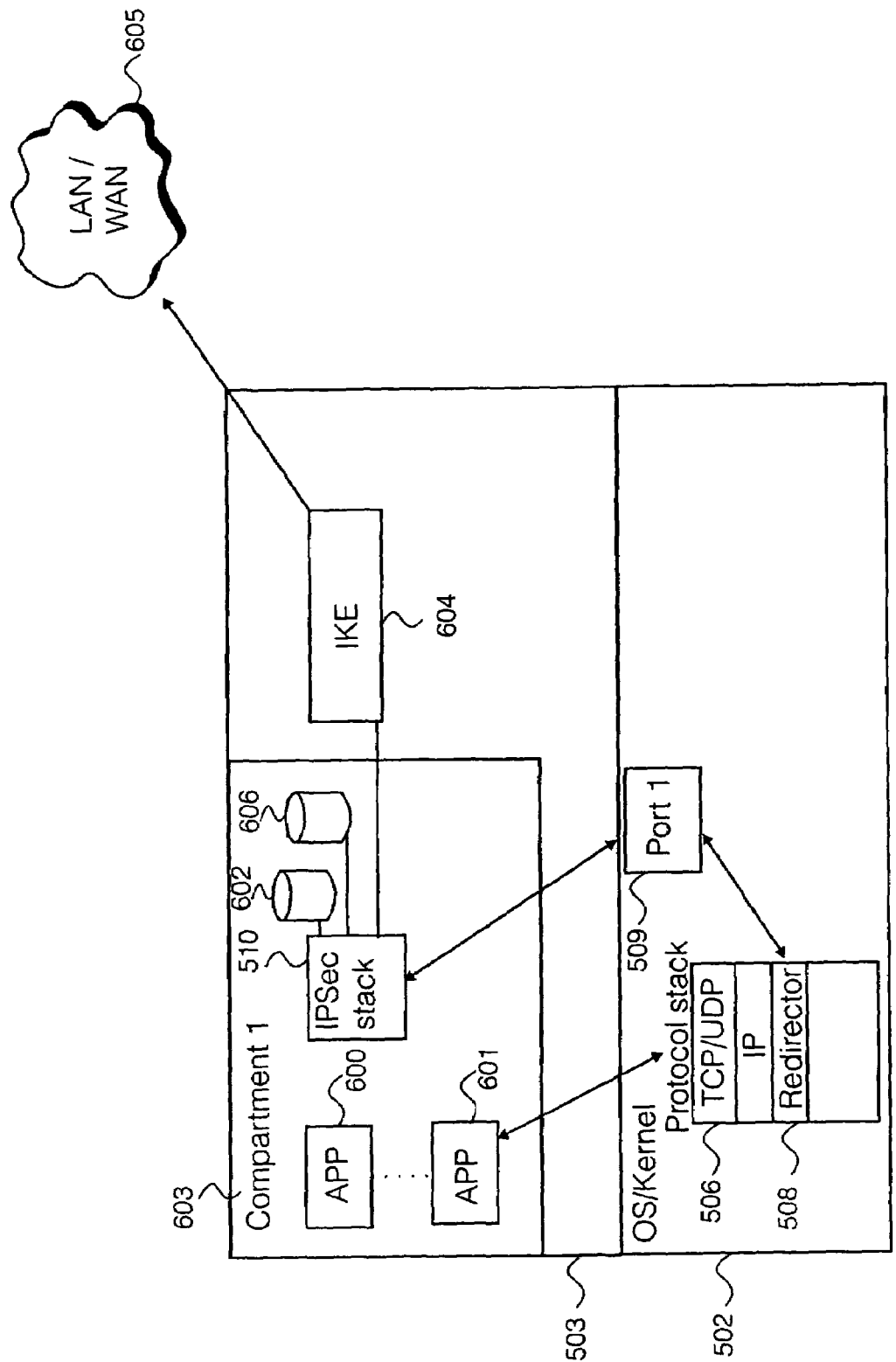
FIG. 6 illustrates schematically a specific implementation of the present invention showing an internet protocol security (internet protocol security) stack located in a user memory space triggering a internet key exchange agent device to negotiate an exchange of keying material with a remote computing entity across a communications network.

Referring to FIG. 6 herein there is illustrated schematically in more detail the first embodiment of the present invention. As described herein before, a redirector layer 508 within the protocol stack logically located within first memory area 502 reserved for the operating system communicates via software port 509 with internet protocol security stack 510 associated with a plurality of applications 600, 601. Internet protocol security stack 509, its associated key database 602 and user applications 600 and 601 may be considered conceptually as being located within a single memory compartment 603 which is a further logical sub division of the user memory area 503. User applications and processes depicted as residing within memory compartment 603 are all processes and/or files and/or data having a same level of security as indicated by their corresponding respective security labels as described herein above. If application 600 requires to transfer data to a remote application running on a remote computing entity across a VPN then the data to be transferred is sent to the network protocol stack located within the first area of memory reserved for the operating system. The data is packetized and redirected via the redirector layer within the network protocol stack to the software port 509. The data packet to be transmitted is sent to the internet protocol security stack 510. Every data packet to be transmitted must, in order to conform with the internet protocol security protocol, be checked by the internet protocol security stack 510 against a security policy database associated with key database 602. Data describing a security policy, comprising a predetermined set of rules for dealing with data packets, is stored in a security policy database 605 and is accessible by the internet protocol security stack 510. If internet protocol security stack 510 detects that it has not received a security association for transferring a particular type of data, for example, to a remote host then internet protocol security stack 510 instructs an Internet Key Exchange (IKE) block 604 to initiate a negotiation procedure with a corresponding respective internet keying agent associated with the remote host across a LAN/WAN 605. Preferably, Internet Keying agent 604 is implemented as a process running outside of the operating system and is resident in user memory. The term "security association" as used herein refers to a plurality of security services provided for and attached to individual IP packets securely transmitted across a virtual private network. Each security association inherits a same security label as a corresponding respective data packet with which it is associated. A security association is uniquely identified by:

A security parameter index (SPI);
An IP destination address; and
A security protocol identifier.

Figure 7:
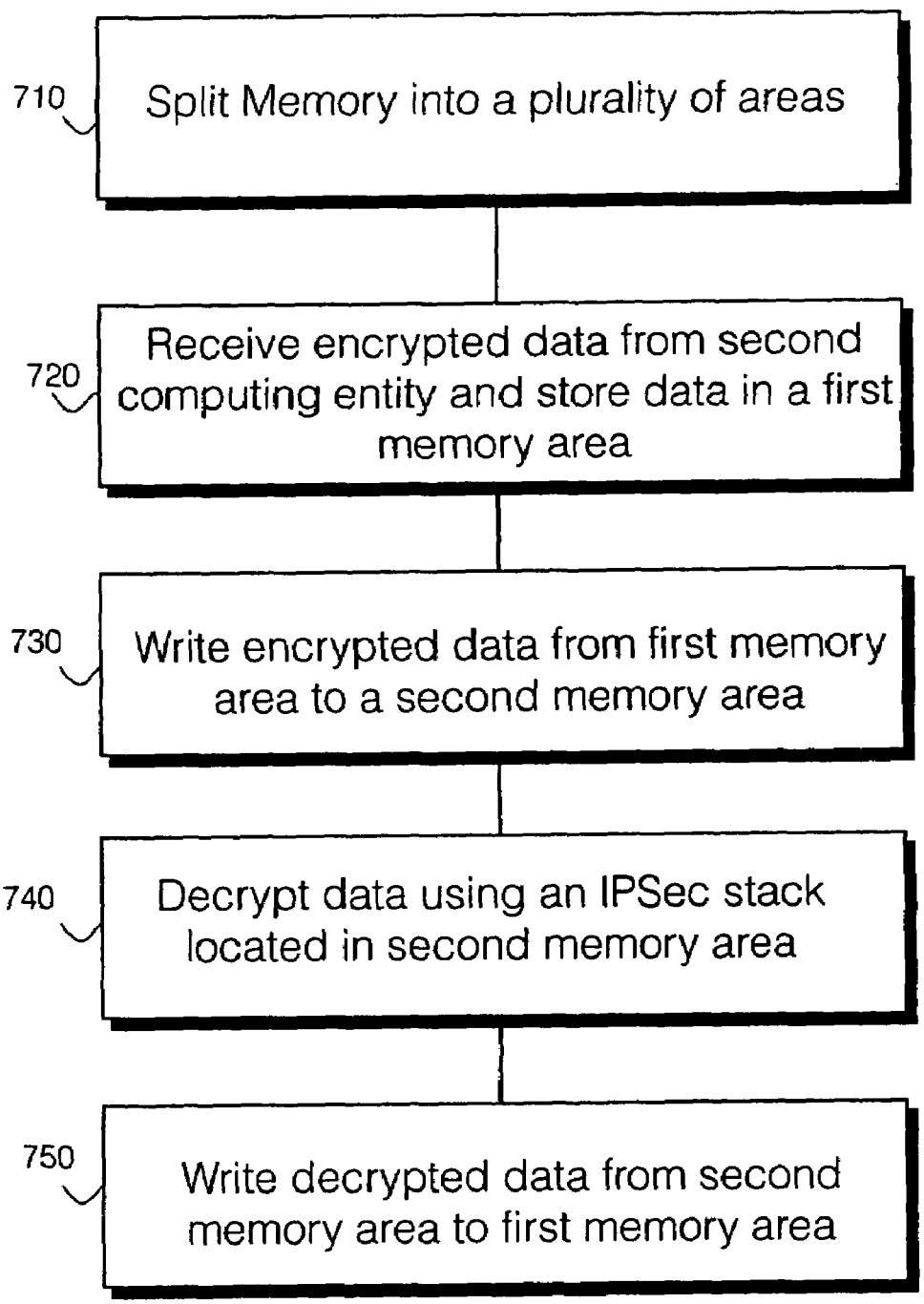
FIG. 7 illustrates schematically an overview of process steps implemented by a first communicating entity in response to receiving encrypted data from a second computing entity across a virtual private network according to a first specific method of the present invention.

Referring to FIG. 7 herein, there are illustrated schematically in overview, a set of process steps implemented by a first computing entity upon receipt of encrypted data from a second computing entity across a virtual private network according to the best mode described herein. In step 710, a memory means within the first computing entity is split into at least a first area and a second area. The first memory area is configurable to store the operating system and the second memory area is configurable to act as user memory to store user applications and the like. In step 720, encrypted IP data packets, encrypted according to the internet security protocol, are received from a second computing entity across a virtual private network via network interface card 505 and the encrypted data is temporarily stored within the network protocol stack located within the first memory area. In step 730, the encrypted data are transferred up through subsequent layers of the network protocol stack until they enter redirector layer 508. When the encrypted data enter the redirector layer 508 they are redirected to internet protocol security stack 510 which is located within the second memory area 503 via a port 509. In step 740, the encrypted data stored within the internet protocol security stack 510 decrypts the encrypted data. In step 750, decrypted data is passed from internet protocol security stack 510 via software port 509 back to the redirector layer 508 within the network protocol stack located within the first memory area.

Figure 8:
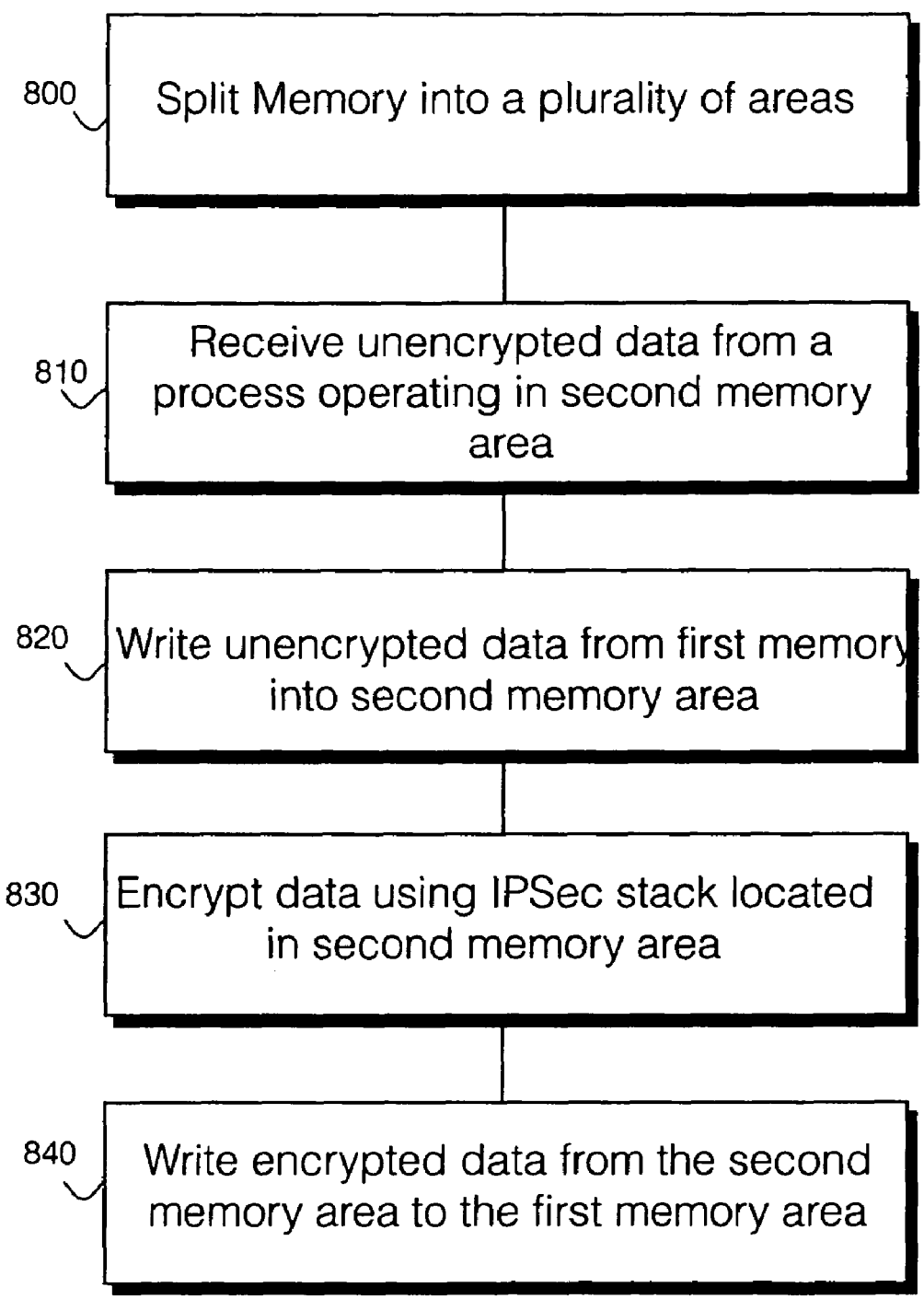
FIG. 8 illustrates schematically an overview of process steps implemented by a first computing entity for transmission of data to a second computing entity across a virtual private network according to a second specific method of the present invention.

Referring to FIG. 8 herein there are illustrated schematically an overview of process steps implemented during the transfer of user data from the first computing entity to a second computing entity across a virtual private network according to the best mode presented herein. In step 800, the memory means within the first computing entity is split into at least a first area 502 and a second area 503. The first memory area stores the operating system and the second memory area is configured to act as user memory to store user applications and the like. In step 810, a user application 600 wishing to send data to a second computing entity across a virtual private network writes unencrypted data from the second memory area (which is user memory) into the network protocol stack located within the first memory area. In step 820, the unencrypted data passes down the network protocol stack until it enters redirector layer 508. Redirector layer 508 writes the data from the network protocol stack to the internet protocol security stack located in the second memory area 503 via port 509. In step 830, the internet protocol security stack 510 encrypts the data. In step 840, the encrypted data is written from the internet protocol security stack within the second memory area back into redirector layer 508 of the network protocol stack located within the first memory area via port 509.

Figure 9:
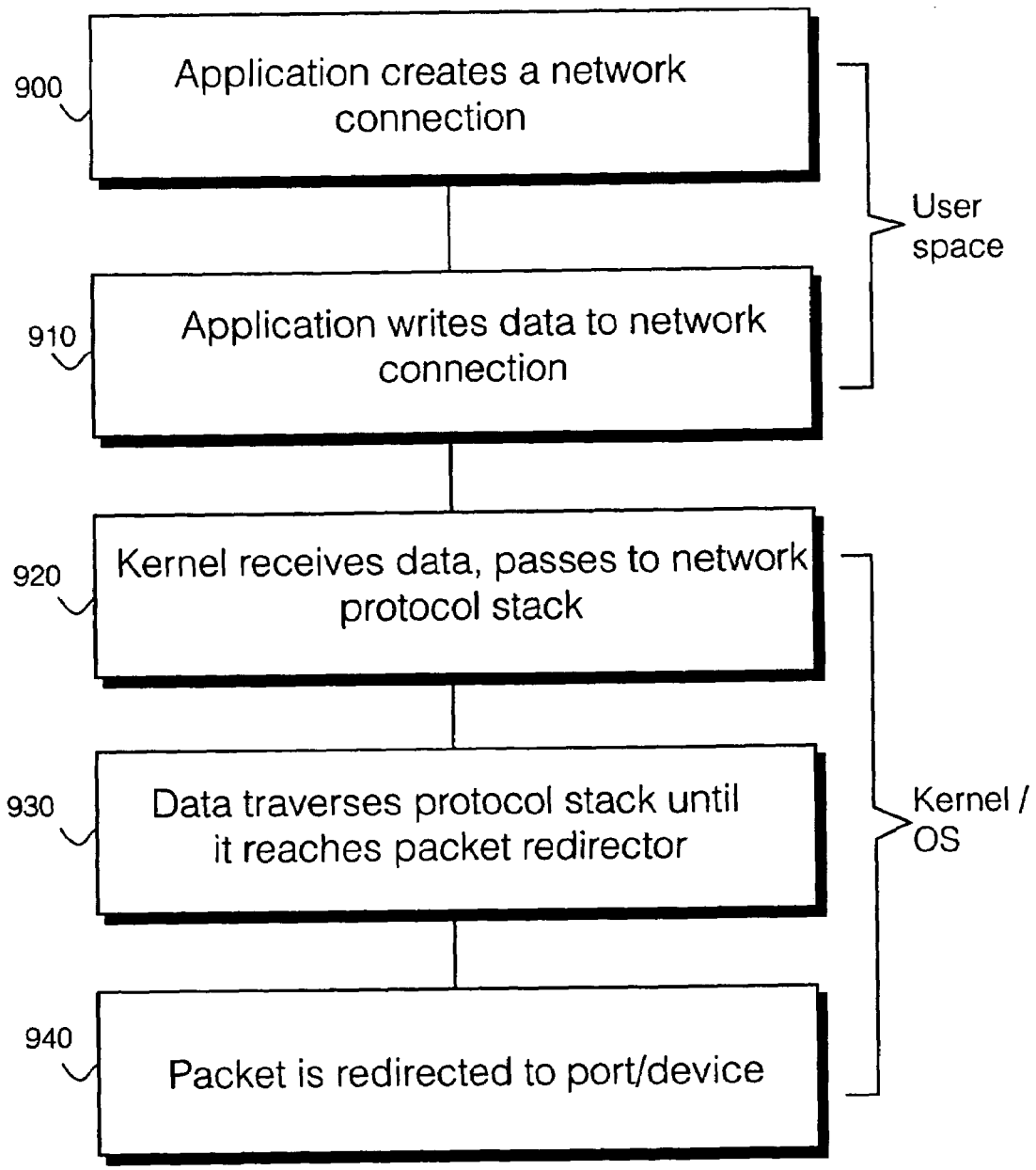
FIG. 9 illustrates schematically a flow diagram summarising the process steps performed when an application requests to exchange data with a remote computing entity according to a third specific method of the present invention.

Referring to FIG. 9 herein, there are illustrated schematically process steps implemented by applications within user memory and the operating system according to the best mode described herein. In step 900 an application 601 requires to transmit data to a remote host. The application, which may comprise a plurality of processes operating in user memory, creates a socket buffer within the operating system. A user application creates a socket by issuing a system call to the operating system. Having received a system call from an application the operating system creates a socket buffer which is logically located within the operating system to act as an intermediary in a transfer of data between the protocol stack and the application. In step 910, the application writes data to the socket buffer (also known herein as a network connection). Each data packet written to the socket buffer inherits a security label having a same level of security as the application which generated the socket buffer in step 900. In step 920 the security labeled data packet is written from the socket buffer to the highest level layer of the TCP/IP network protocol stack 506. In step 930, the labeled data packet traverses "down" through the sequence of layers of the network protocol stack until it reaches redirector layer 503. Redirector layer 508 is configured such that every data packet arriving from either a higher layer in the protocol stack or a lower layer in the protocol stack is redirected to the port 509 which is logically connected to the compartment containing the application which initially generated the data packets and created the network connection in step 900 and also contains a corresponding internet protocol security stack 510.

Figure 10:
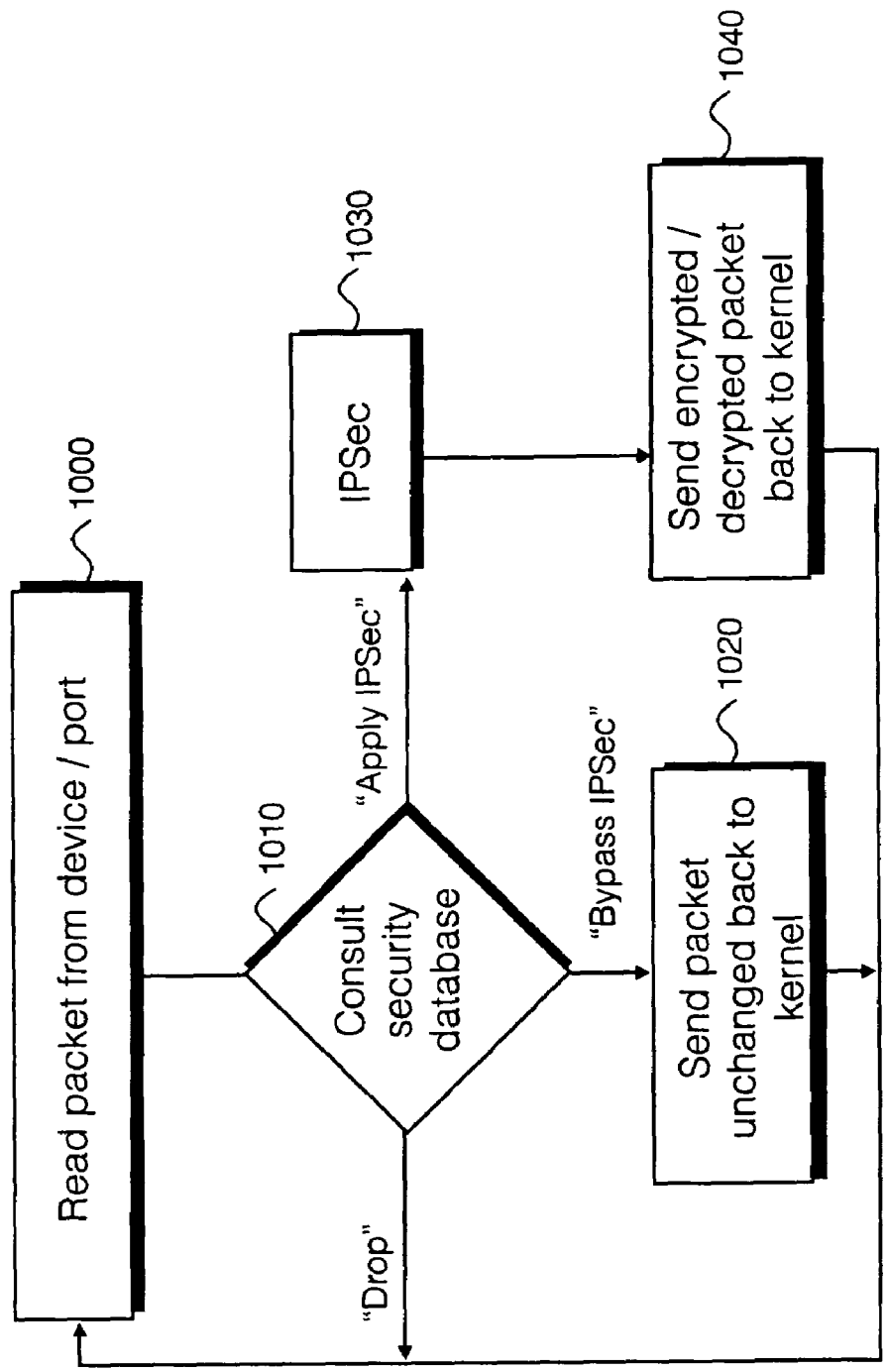
FIG. 10 illustrates schematically process steps performed by a protocol stack an internet protocol security stack on receipt of a data packet from a kernel/operating system according to a fourth specific method of the present invention.

Referring to FIG. 10 herein there is illustrated schematically process steps implemented by internet protocol security stack 510 in response to receipt of an IP packet from the operating system. In step 1000, the internet protocol security stack receives a data packet from a port logically located within the operating system. In step 1010, a security policy database (SPD) associated with key database 602 is consulted by the internet protocol security stack to determine how the received data packet should be treated. For each data packet received by the internet protocol security stack there are three possible outcomes of this consultation process as follows:

"Apply internet protocol security";
"Bypass internet protocol security";
"Drop".

For incoming data packets received from the remote host across a LAN/WAN each packet received from the operating system is inspected to see if internet protocol security decryption is necessary by examining a security descriptor data comprising a part of a security association data logically associated with the data packet. In step 1030, decryption of the encrypted data packet is performed and, if successful, the decrypted data packet is sent back to the TCP/IP stack within the kernel via port 509. Alternatively, if the received data packet does not require decrypting then, in step 1020, the unprocessed data packet is forwarded to the kernel via port 509. If, for example, the data packet is received from a remote host from which receipt of data is forbidden, then any data packets originating from the "banned" remote hosts are dropped. The process of dropping a data packet as described herein comprises overwriting the location within the memory containing the dropped data packet with another data packet.

FIG. 10 illustrates schematically process steps applied to outgoing data packets generated by, for example, a process operating within the user memory of the local host. If a user process 600 wishes to transmit a data packet or plurality of data packets to a remote host across a network then, in step 1000, a data packet to be transmitted enters the redirector layer 508 within the protocol stack and is redirected via port 509 to the internet protocol security stack residing within the compartment 603 logically located within the user memory area 503. In step 1010, the security database associated with key database 602 is consulted to determine whether the data packet received from user process 600 is to be encrypted prior to transmission across the network. If it is determined that the received data packet is to be encrypted, then in step 1030, the data packet is encrypted and, in step 1040, returned to the protocol stack via port 509. If the security policy database specifies that the data packet to be transmitted is not to be encrypted then in step 1020 the unprocessed packet is returned via the port 509 to the protocol stack. Any packets banned from transmission by the local computing entity, after consultation of the security policy database, are dropped.

Figure 11:
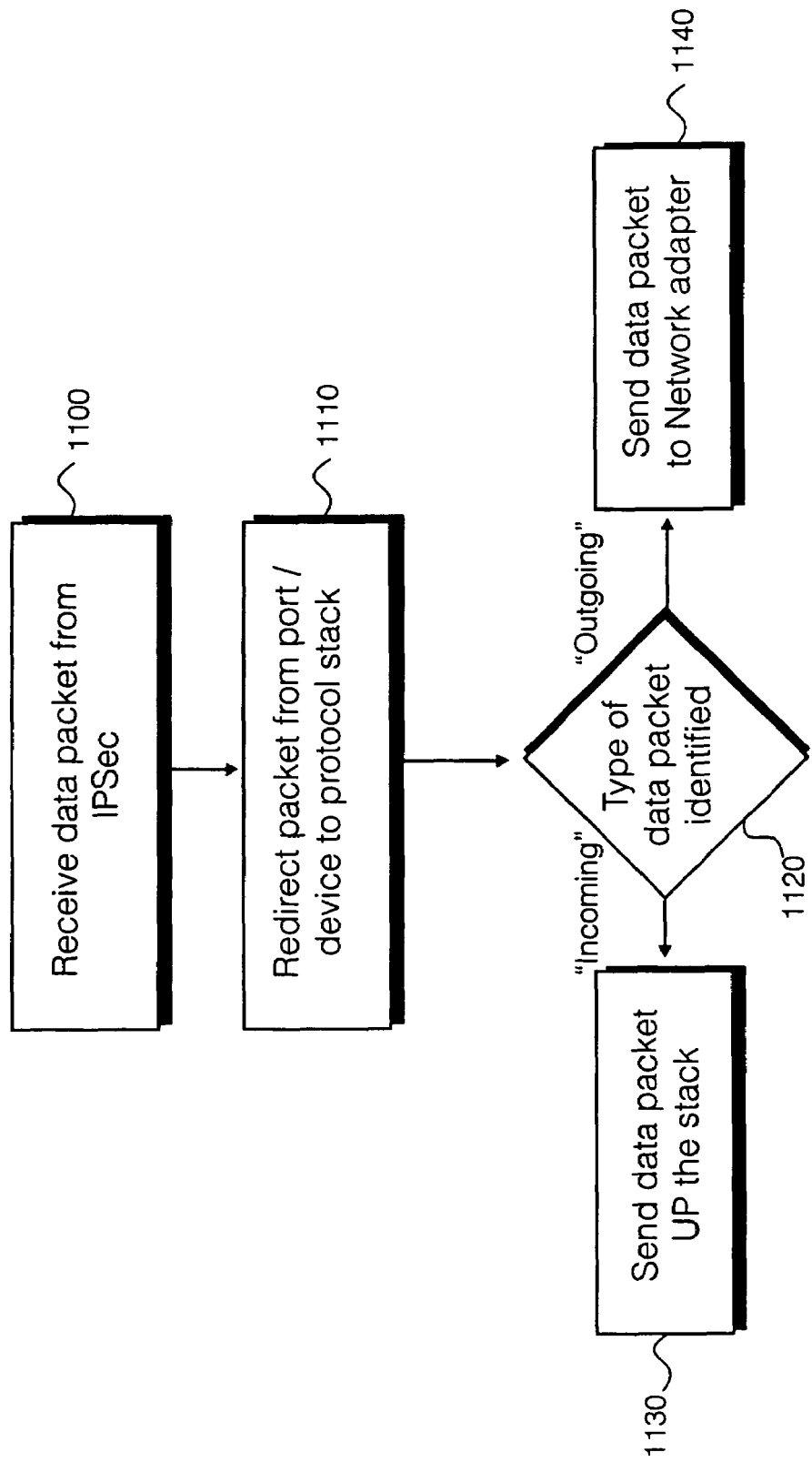
FIG. 11 illustrates schematically a flow diagram of steps performed after an internet protocol security stack has encrypted or decrypted a data packet according to a fifth specific method of the present invention.

Referring to FIG. 11 herein, there are illustrated schematically process steps performed by the redirector layer 508 within the network protocol stack according to the best mode presented herein. In step 1100, a security labeled data packet is received from an internet protocol security stack via a port. The received data packet may be encrypted if, for example, the data packet has been originated by a local application located in a same compartment in user space as the internet protocol security stack performing the encryption. Alternatively, the data packet may be decrypted in the case of a incoming data packet received from a remote computing entity across a communications network. In step 1110, having received a data packet from an internet protocol security stack the redirector layer 508 redirects the data packet from the port into the protocol stack within the kernel/operating system. In step 1120, each received data packet which is identified by the redirector layer to be either "incoming" in other words a data packet received from a remote computing entity across a LAN/WAN and, in which case, the decrypted data packet is sent up the protocol stack in step 1130, or "outgoing". If the redirector layer 508 identifies the data packet as "outgoing" then, in step 1140, the encrypted data packet is sent down the protocol stack to a network adapter card prior to transmission across the LAN/WAN to a remote computing entity. The LAN/WAN may comprise a physical network such as an Ethernet or Asynchronous transfer mode connection or the like.

In summary, FIGS. 7, 8, 9, 10 and 11 represent the flow of data packets from a user application in user memory, down through the network protocol stack until being redirected to a corresponding internet protocol security stack in a same compartment of user memory as the user application originating the data. Additionally, these figures illustrate the flow of data back from an internet protocol security stack into the redirector layer prior to transmission across a LAN/WAN. FIGS. 7, 8, 9, 10 and 11 also represent the flows of data packets from a computer across a communications network and entering the network protocol stack of the local computing entity via a network interface card before being redirected into an internet protocol security stack located within user memory. After decryption, the data packets are returned to the network protocol stack prior to the data packets proceeding up the network protocol stack for further processing by the kernel and/or user applications within user memory.

Locating an internet protocol security stack outside of an area of memory containing the operating system offers significant advantages over prior art encryption systems used in virtual private networks. In particular, location of an internet protocol security stack in user memory rather than within the operating system may render a computer using such an implementation more tolerant to programming errors arising from the internet protocol security stack and more able to deal with malformed data packets. Prior art secure networks implementing the internet protocol security must necessarily be using comparatively recently written computer programs since the internet protocol security itself has been introduced only comparatively recently. Hence, any computer code implementing the internet protocol security will, inevitably, have incorporated a larger number of errors than the more well established computer code such as operating within the operating system. Incorporation of the code associated with an internet protocol security stack into the network protocol stack as implemented in prior art virtual private networks renders the entire operating system open to failure should the comparatively untested internet protocol security stack fail.

In the present best mode, incorporation of an internet protocol security stack into user memory effectively isolates the operating system and in particular the kernel from internet protocol security stack failure thereby rendering the system more tolerant to faults. Additionally, implementation of an internet protocol security stack within user space as described herein allows for the possibility of parallel processing of data packets by a plurality of processors enabling a potential increase in the throughput of data transmitted or received across virtual private network. It has been found experimentally by the inventor that the steps of redirecting data packets from a network protocol stack into user memory and then returning the data packets to the redirector layer does add a small time penalty compared with data packets passing straight through the protocol stack without redirection. Typically, it is found that redirection of data packets into user space slows the transfer of data packets by approximately 4% compared with un-redirected packets. However, the potential substantial gains in processing speed resulting from the use of multiple processors to perform the internet protocol security processing when the internet protocol security stack is located in user memory significantly outweighs the time penalties involved in data packet redirection.

Figure 12:
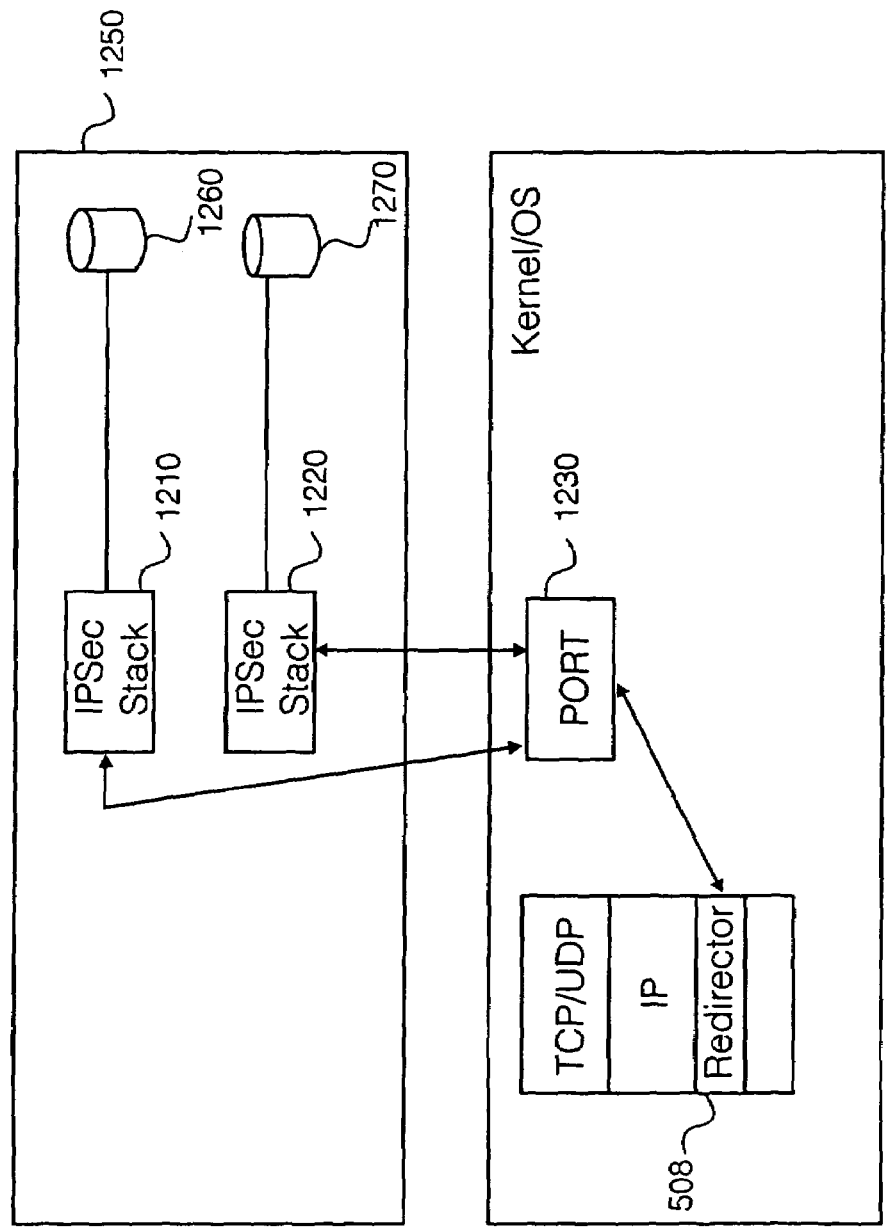
FIG. 12 illustrates schematically a fault tolerant encryption/decryption system for use in transmitting encrypted data between computing entities across a network according to a second specific implementation of the present invention.

Referring to FIG. 12 herein there is illustrated schematically a second specific implementation of the present invention. Located within an area of user memory a single memory area compartment 1250 is assigned to a plurality of internet protocol security stacks illustrated herein by way of example by first and second internet protocol security stacks 1210 and 1220. In order to minimize the possibility of experiencing internet protocol security stack failure which can result in sending corrupted data packets back to the operating system it is possible to implement several versions of the internet protocol security stack within a single memory area 1250 which is assigned for use by the internet protocol security stacks and is separate from a memory area used by the kernel of the operating system. Each implementation of the internet protocol security stack may be generated using a different compiler or, for example, a different programming language. Whilst it is possible that each implementation of the internet protocol security stack will contain programming errors there is a very low probability that different implementations of the internet protocol security stack will manifest the same errors in response to an identical input. According to a second embodiment of the present invention, it is arranged that a plurality of internet protocol security stacks 1210, 1220 are provided within a single memory area each internet protocol security stack accessing a corresponding respective key database 1260, 1270. The data stored within the plurality of key databases 1260 and 1270 are identical or overlapping. Comparison of the outputs of the plurality of redundant internet protocol security stacks can be used to identify a correct output. According to the second embodiment of the present invention the plurality of redundant internet protocol security stacks 1210, 1220 within a single compartment all exchange data with a redirector layer 508 within a network protocol stack via a single port 1230.

Locating a plurality of different implementations of an internet protocol security stack within a single compartment of memory area, each internet protocol security stack accessing a corresponding respective key database each key database containing identical or substantially similar security data yields the following advantages:

- increased fault tolerance by isolating an internet protocol security stack in user memory logically distinct from an area of memory containing an operating system;
- locating multiple redundant internet protocol security stacks accessing the same security database information reduces the probability of a bug within a single internet protocol security stack sending corrupted data back to the network protocol stack again yielding improved fault tolerance;
- locating a plurality of internet protocol security stacks in user memory enables the processing power of a plurality of processors to be used in encryption and decryption thereby yielding improved data throughput rates.

Experiments have been carried out to test the throughput rates for implementations of the inventions described herein above comprising one internet protocol security stack per compartment in user space against two internet protocol security stacks per compartment in user space. A test used comprised, in both cases, a transfer of an encrypted 8 Mb file from a server using the file transfer protocol (FTP). In the case of the two internet protocol security stack per compartment implementation, the processing of internet protocol security packets was distributed approximately evenly between the individual internet protocol security stacks.

The results were that the second implementation of the present invention yields higher data throughput rates by distributing the processing of encrypted data packets between multiple internet protocol security stacks and a plurality of processors. For the case of one internet protocol security stack per compartment, an average throughput of 321 kb/sec was achieved. For a corresponding second implementation having two internet protocol security stacks per compartment, an average throughput of 483 kb/per sec was achieved.

Figure 13:
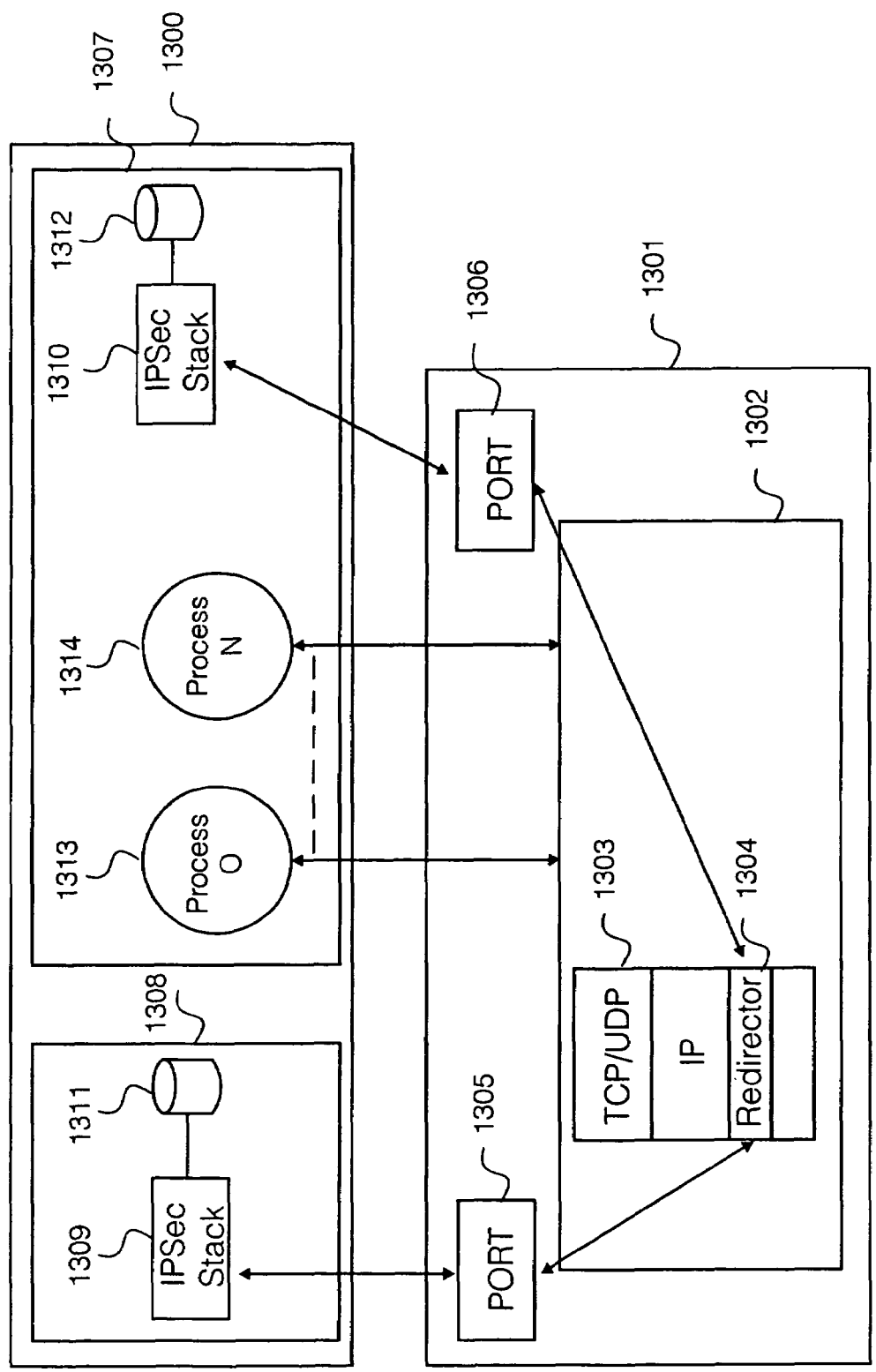
FIG. 13 illustrates schematically a plurality of internet protocol security stacks operating in a plurality of corresponding respective compartment memory areas which are distinct from each other, in an area of user memory according to third specific implementation of the present invention.

Referring to FIG. 13 herein, there is illustrated schematically a third specific implementation according to the present invention, in which is provided a second area of user memory 1300, which is distinct from a first memory area 1301 containing a kernel code 1302 of an operating system within which is a protocol stack 1303 containing a redirector layer 1304 and a plurality of ports 1305, 1306, for example STREAMS ports; and a plurality of further memory areas 1307, 1308 resident within the area of user memory 1300, the user memory area being an area reserved for applications and processes running under control of the operating system of the computer entity, in which the plurality of compartment memory areas within the user memory each contain at least one corresponding respective internet protocol security stack 1309, 1310, having a corresponding respective key database 1311, 1312, such that a plurality of internet protocol security processes run in parallel and simultaneously within the user memory, each internet protocol security stack running in its own separately assigned compartment memory area, which is logically isolated from and logically distinct from other compartment memory areas.

The compartment memory areas preferably are each assigned specifically to one or more internet protocol security stacks and their associated key databases, but optionally may also run other processes, such as a plurality of user applications 1313, 1314 which interface with the operating system in the first memory area 1301, without passing through the STREAMS ports.

Isolation of separate internet protocol security stacks in separate compartment memory areas may achieve increased robustness and reliability of the operating system and its kernel through isolation of the internet protocol security stack from the first memory area containing the code of the kernel, and additionally may provide increased robustness for each of the plurality of internet protocol security stacks, from faults and crashes caused by other ones of the plurality of internet protocol security stacks. Each internet protocol security stack operates as a separate process running in its corresponding respective compartment memory area. If an internet protocol security process crashes, basic operation of the kernel of the operating system remains unaffected, and the effect on the kernel is limited to the port assigned to that internet protocol security stack being unable to communicate effectively with the stack. Other internet protocol security stacks which are in different compartments are isolated from the crashed internet protocol security stack and may continue running as normal.

Where separate processes such as applications are running in a same compartment memory area as an internet protocol security stack which has crashed, then those processes are also vulnerable to fault caused by the crash of the internet protocol security stack in that particular compartment memory area. Whilst running of separate processes in a same compartment memory area assigned to an internet protocol security stack is possible in implementations of the invention, in the best mode, a compartment memory area is assigned specifically and exclusively to an internet protocol security stack, and its associated key database, so that a fault in an internet protocol security stack in a given compartment does not automatically cause the processing of other internet protocol security stacks in other compartments, or the kernel, or other processes such as applications being run to fail. Providing different internet protocol security stacks in different compartment memory areas also has an advantage that different streams of data can be processed independently by their own dedicated internet protocol security stacks, independently of other data streams.

Figure 14:
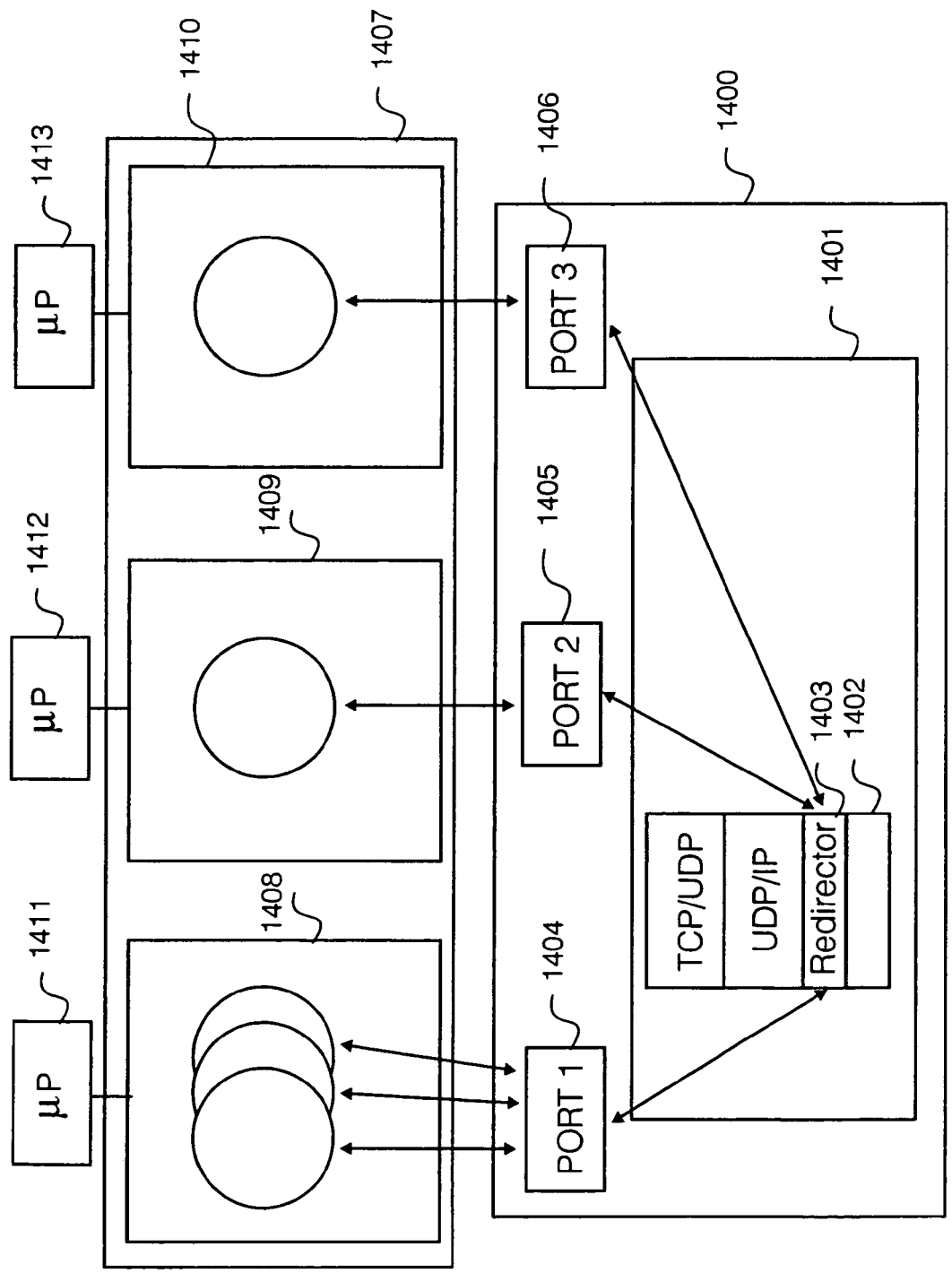
FIG. 14 illustrates schematically a plurality of separate compartment memory areas in an area of user memory distinct from an area of memory reserved for an operating system, the plurality of compartment memory areas each running one or a plurality of processes in parallel, and each compartment memory area supported by a corresponding respective data processing capacity in the form of a corresponding microprocessor, according to fourth specific implementation of the present invention.

Referring to FIG. 14 herein, there is illustrated schematically a fourth specific implementation according to the present invention, in which a first memory area 1400 of a first computing entity contains an operating system kernel 1401 having a transport protocol stack 1402 which includes a redirector layer 1403, there being provided a plurality of STREAMS ports 1404–1406 within first memory area 1400 for communicating one or more packet data streams to a plurality of internet protocol security stacks operating in an area of user memory 1407 which is assigned as a plurality of compartment memory areas 1408–1410, each compartment memory area having the benefit of processing capabilities provided by a corresponding respective microprocessor 1411–1413. In FIG. 14, processes carried out by the internet protocol security stacks are illustrates as circles, one circle per separate process running. A single internet protocol security stack may run a plurality of separate processes, that is to say may process a set of separate individual packet data streams on a multiplex basis, or alternatively a plurality of different internet protocol security stacks in different compartment memory areas may by applied, each having its own processing power supplied by a corresponding microprocessor to process a single stream of data packets in parallel.

A plurality of packet data streams passing down protocol stack 1402 in the kernel 1401 are directed by redirector layer 1403 to the plurality of ports 1404–1406 and to the corresponding respective compartment memory areas 1408–1410. A first stream of packet data may be routed from the redirector layer 1403 through a STREAMS port 1404, into a first compartment 1408, and the packet data stream may be encryption processed, either to encrypt the stream or decrypt the stream in a plurality of processes shown schematically as circles in FIG. 14, with the processing power being supplied by a first microprocessor 1411. The encryption processed first data stream is then returned through the first port 1404 back to the redirector layer 1403 and on to the next layer in the communications protocol stack 1402 in encryption processed format.

Similarly, a second data stream passing up or down the communications protocol stack 1402 is passed by redirector layer 1403 to a second port 1405, which passes the data stream out of the first memory area 1400 into the user memory area 1407, and in particular into a second compartment memory area 1409 where the second packet data stream is encryption processed, represented as a circle in FIG. 14, with processing power for the encryption processing being provided by a second microprocessor 1412. The encryption processed second data stream is returned via the second STREAMS port 1405 back to the redirector layer 1403 and from the redirector layer onto the next layer either above or below, depending on which way the data packet stream is passing through the stack.

Providing a plurality of different processes running in a plurality of compartment memory areas which are distinct from each other may achieve the advantages mentioned herein before of robustness in that if one process fails in a first compartment memory area, other processes in other compartment memory areas may continue unaffected. By applying separate processing capability in the form of a corresponding respective microprocessor to each separate compartment memory area, as well as enhancing reliability and robustness, the amount of throughput of data processing in terms of Mflops/s can be enhanced using the architecture and method of operation illustrated schematically in FIG. 14 herein.

What is claimed is:

1. A method of processing encryption data in a computing entity, comprising:
   assigning a memory means of said computing entity into a plurality of memory areas including a user space and a kernel space;
   receiving encrypted data;
   storing said encrypted data in said kernel space, said kernel space being assigned for use by a kernel code of an operating system of said computing entity;
   writing said encrypted data stored in said kernel space into said user space, said user space being assigned for storing user application programs running on said computing entity;
   decrypting said encrypted data stored in said user space; and
   writing said decrypted data from said user space to said kernel space.

2. A method as claimed in claim 1, wherein said kernel space is logically distinct from said user space.

3. A method as claimed in claim 1, wherein said kernel space is configured to contain code of said operating system.

4. The method as claimed in claim 1, wherein said user space is not used for storage of code of a kernel of said operating system.

5. The method as claimed in claim 1, wherein said decrypting said encrypted data stored in said user space is carried out by an internet security protocol program resident in said user space.

6. A method of processing encryption data in a computing entity comprising:
   assigning a memory means of said computing entity into a plurality of memory areas including a user space and a kernel space;
   storing decrypted data in said kernel space, said kernel space being assigned for use by a kernel code of an operating system of said computing entity;
   writing said stored data into said user space, said user space being assigned for storing user application programs running on said computing entity;
   encrypting said data stored in said user space; and
   writing said encrypted data from user space to said kernel space.

7. A method as claimed in claim 6, wherein said kernel space is logically distinct from said user space.

8. A method as claimed in claim 6, wherein said kernel space is configured to contain code of said operating system.

9. A method as claimed in claim 6, wherein said user space is not used for storage of code of a kernel of said operating system.

10. A method as claimed in claim 8, further comprising redirecting said encrypted data from said operating system in said kernel space to an encryption/decryption stack resident in said user space.

11. A method as claimed in claim 9, comprising directing said data to said user space from said kernel space.

12. A method as claimed in claim 6, wherein said encrypting said data stored in said user space is carried out by an internet protocol security program stored in said user space.

13. A method of processing encrypted data in a computing entity, said computing entity comprising a processor and a memory means divided into a user space and a kernel space, wherein said first memory area kernel space contains code of an operating system of said computer entity, said method comprising:
   receiving an encrypted data packet;
   processing said data packet according to at least one packetization protocol of said operating system in said kernel space;
   outputting said data packet to said user space;
   processing said data packet according to a decryption algorithm in said user space; and
   returning said processed data packet to said operating system in said kernel space.

14. A digital computer configurable for transmitting digital data across a communications network,
  at least one microprocessor unit;
  memory means, wherein said memory means is logically sub divided into at least a user space and a kernel space and characterized by further comprising redirection means for writing data from said kernel space to said user space and from said user space to said space; and
  encryption means logically located within said user space, said encryption means being configurable for encrypting said digital data for transmission across the communications network.

15. A digital computer configurable for receiving digital data transmitted across a communications network, comprising:
  at least one microprocessor unit;
  a memory means, wherein said memory means is assigned into at least a user space and a kernel space and characterized by further comprising a redirection means for writing data from said kernel space to said user space and from said user space to said kernel space; and
  decryption means logically located within said user space for decrypting data stored in said user space, said decryption means being configurable for decrypting said data.

16. A digital computer as claimed in claim 15, wherein said redirection means comprises:
  a redirection layer; and
  a port for interfacing said redirection layer and said an encryption means.

17. A digital computer as claimed in claim 15, wherein said encryption means logically located within said user space comprises:
  an internet protocol security stack; and
  a database configurable to contain key data for encrypting said data.

18. A digital computer as claimed in claim 15, wherein said encryption means logically located within said user space comprises:
  a plurality of internet protocol security stacks; and
  a plurality of data bases configurable to contain key data for encrypting said data, wherein each data base of said plurality of databases contains a same key data.

19. A digital computer as claimed in claim 18, wherein said plurality of internet protocol security stacks are generated using a plurality of computing languages.

20. A computing entity comprising:
  a data processing means;
  a memory means;
  an operating system having a set of kernel code, containing a communications protocol stack code;
  a plurality of encryption and decryption means;
  a first area of said memory means being assigned to said operating system code;
  a second area of said memory means being assigned to said plurality of encryption and decryption means, said second memory area being sub-assigned into a plurality of compartmented memory areas within said second memory area, wherein individual ones of said encryption and decryption means are resident in corresponding respective ones of said plurality of compartmented memory areas.

21. The computing entity as claimed in claim 20, further comprising a director means resident in said first memory area, said director means arranged to input data from and output data to said communications protocol stack.

22. The computing entity as claimed in claim 21, wherein said director means sends a plurality of data streams to said plurality of compartmented memory areas and receives a plurality of data streams from said plurality of compartmented memory areas.

23. The computing entity as claimed in claim 21, wherein said director means operates to send a corresponding respective data stream to each of said plurality of compartmented memory areas, and receive said corresponding respective data stream from said corresponding compartmented memory areas.

24. The computing entity as claimed in claim 20, further comprising a plurality of ports resident in said first memory area, there being at least one said port per said compartmented memory area, said port positioned between a said corresponding respective compartmented memory area, and a director means for directing data streams to and from said plurality of compartmented memory areas, said director means being resident in said first memory area.

25. The computing entity as claimed in claim 20, comprising a plurality of data processor means, said plurality of data processors providing processing capability for carrying out data processing operations within said plurality of compartmented memory areas.

26. A method of encryption processing a plurality of packet data streams between first and second layers of a communications protocol stack, comprising:
  receiving a first said data packet stream from a first layer of said protocol stack in a kernel memory space that is assigned for use by a kernel code of an operating system comprising said protocol stack;
  sending said data packet stream to a first compartmented memory area of a user memory space that is logically distinct from said kernel memory space;
  running an encryption process on said first data packet stream in said first compartmented memory area for encryption or decryption of said data packet stream;
  returning said processed data packet stream from said first compartmented memory area to a second layer of said communications protocol stack in said kernel memory space;
  receiving a second packet data stream from a said first or second layer of said communications protocol stack in said kernel memory space;
  sending said second data packet stream to a second compartmented memory area of said user memory space;
  encryption processing said second data packet stream in said second compartmented memory area for encryption or decryption of said data packet stream; and
  returning said processed second packet data stream to the other one of said first or second said layers of said communications protocol stack in said kernel memory space,
  wherein said first compartmented memory area is assigned to said first process and said second compartmented memory area is assigned to said second process.

27. The method as claimed in claim 26, comprising running a plurality of processes in a said compartmented memory area, for processing a single said packet data stream.

* * * * *